(12) United States Patent
Damewood et al.

(10) Patent No.: US 11,861,032 B2
(45) Date of Patent: *Jan. 2, 2024

(54) ADAPTIVE DIFFERENTIALLY PRIVATE COUNT

(71) Applicant: Snowflake Inc., Bozeman, MT (US)

(72) Inventors: Liam Damewood, Walnut Creek, CA (US); Oana Niculaescu, Berkeley, CA (US); Alexander Rozenshteyn, Berkeley, CA (US); Ann Yang, Berkeley, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/714,785

(22) Filed: Apr. 6, 2022

(65) Prior Publication Data

US 2022/0229931 A1 Jul. 21, 2022

Related U.S. Application Data

(63) Continuation of application No. 17/173,936, filed on Feb. 11, 2021, now Pat. No. 11,328,084.
(Continued)

(51) Int. Cl.
*G06F 16/245* (2019.01)
*G06F 21/62* (2013.01)

(52) U.S. Cl.
CPC ........ *G06F 21/6227* (2013.01); *G06F 16/245* (2019.01)

(58) Field of Classification Search
CPC ........................... G06F 16/245; G06F 21/6227
See application file for complete search history.

(56) References Cited

U.S. PATENT DOCUMENTS

| 6,038,563 A | 3/2000 | Bapat et al. |
| 6,438,549 B1 | 8/2002 | Aldred et al. |

(Continued)

FOREIGN PATENT DOCUMENTS

| CA | 3108956 | 4/2021 |
| CA | 3108956 | 9/2023 |

(Continued)

OTHER PUBLICATIONS

Chaudhuri, S et al. "Database Access Control & Privacy: Is There a Common Ground?" CIDR 2011: Fifth Biennial Conference on Innovative Data Systems Research, Jan. 9-12, 2011, pp. 96-103.
(Continued)

*Primary Examiner* — Alicia M Willoughby
(74) *Attorney, Agent, or Firm* — Schwegman Lundberg & Woessner, P.A.

(57) ABSTRACT

A differentially private security system communicatively coupled to a database storing restricted data receives a database query from a client. The database query includes an operation, a target accuracy, and a maximum privacy spend for the query. The system performs the operation to produce a result, then injects the result with noise sampled from a Laplace distribution to produce a differentially private result. The system iteratively calibrates the noise value of the differentially private result using a secondary distribution different from the Laplace distribution and a new fractional privacy spend. The system ceases to iterate when an iteration uses the maximum privacy spend or a relative error of the differentially private result is determined to satisfy the target accuracy, or both. The system sends the differentially private result to the client.

20 Claims, 4 Drawing Sheets

Related U.S. Application Data

(60) Provisional application No. 62/975,160, filed on Feb. 11, 2020.

(56) References Cited

U.S. PATENT DOCUMENTS

| | | |
|---|---|---|
| 6,546,389 B1 | 4/2003 | Agrawal et al. |
| 6,618,721 B1 | 9/2003 | Lee |
| 6,823,338 B1 | 11/2004 | Byrne et al. |
| 7,219,237 B1 | 5/2007 | Trimberger |
| 7,356,840 B1 | 4/2008 | Bedell et al. |
| 7,698,250 B2 | 4/2010 | Dwork et al. |
| 7,801,967 B1 | 9/2010 | Bedell et al. |
| 9,002,803 B2 | 4/2015 | Qayyum et al. |
| 9,094,378 B1 | 7/2015 | Yung et al. |
| 9,244,976 B1 | 1/2016 | Zhang et al. |
| 9,384,226 B1 | 7/2016 | Goel et al. |
| 10,192,069 B2 | 1/2019 | Nerurkar et al. |
| 10,229,287 B2 | 3/2019 | Nerurkar et al. |
| 10,642,847 B1 | 5/2020 | Nerurkar et al. |
| 10,733,320 B2 | 8/2020 | Nerurkar et al. |
| 11,328,084 B2 | 5/2022 | Damewood et al. |
| 2001/0034847 A1 | 10/2001 | Gaul, Jr. |
| 2003/0110467 A1 | 6/2003 | Balakrishnan |
| 2003/0177118 A1 | 9/2003 | Moon et al. |
| 2004/0225896 A1 | 11/2004 | Ng |
| 2004/0250120 A1 | 12/2004 | Ng |
| 2005/0278786 A1 | 12/2005 | Tippett et al. |
| 2006/0053112 A1 | 3/2006 | Chitkara et al. |
| 2006/0161527 A1 | 7/2006 | Dwork et al. |
| 2006/0200431 A1 | 9/2006 | Dwork et al. |
| 2006/0224597 A1 | 10/2006 | Fitzpatrick et al. |
| 2006/0238503 A1 | 10/2006 | Smith et al. |
| 2006/0265396 A1 | 11/2006 | Raman et al. |
| 2006/0282433 A1 | 12/2006 | Dutta et al. |
| 2007/0047558 A1 | 3/2007 | Ayers et al. |
| 2007/0136027 A1 | 6/2007 | Dwork et al. |
| 2007/0143289 A1 | 6/2007 | Dwork et al. |
| 2007/0239982 A1 | 10/2007 | Aggarwal et al. |
| 2008/0033960 A1 | 2/2008 | Banks et al. |
| 2008/0133935 A1 | 6/2008 | Elovici et al. |
| 2009/0119298 A1 | 5/2009 | Faitelson et al. |
| 2009/0177685 A1 | 7/2009 | Tanyeri et al. |
| 2009/0249436 A1 | 10/2009 | Coles et al. |
| 2009/0254971 A1 | 10/2009 | Herz et al. |
| 2009/0265354 A1 | 10/2009 | Machak et al. |
| 2009/0327228 A1 | 12/2009 | Krause et al. |
| 2011/0064221 A1 | 3/2011 | McSherry et al. |
| 2011/0078143 A1 | 3/2011 | Aggarwal |
| 2011/0125730 A1 | 5/2011 | Bordawekar et al. |
| 2011/0131222 A1 | 6/2011 | Dicrescenzo |
| 2011/0208763 A1 | 8/2011 | Mcsherry et al. |
| 2011/0238611 A1 | 9/2011 | Mcsherry et al. |
| 2011/0282865 A1* | 11/2011 | Talwar .................. G06F 16/245 707/769 |
| 2012/0109830 A1 | 5/2012 | Vogel |
| 2012/0143922 A1 | 6/2012 | Rane et al. |
| 2012/0166483 A1 | 6/2012 | Choudhary et al. |
| 2012/0197864 A1 | 8/2012 | Bourdoncle et al. |
| 2012/0226492 A1 | 9/2012 | Tsuboi et al. |
| 2013/0031136 A1 | 1/2013 | Shah |
| 2013/0145473 A1 | 6/2013 | Cormode et al. |
| 2013/0332891 A1 | 12/2013 | Schmitlin et al. |
| 2014/0013400 A1 | 1/2014 | Warshavsky et al. |
| 2014/0088989 A1 | 3/2014 | Krishnapuram et al. |
| 2014/0214735 A1 | 7/2014 | Harik |
| 2014/0281572 A1 | 9/2014 | Wang et al. |
| 2014/0282910 A1 | 9/2014 | Palmer et al. |
| 2014/0283091 A1 | 9/2014 | Zhang et al. |
| 2015/0235051 A1 | 8/2015 | Fawaz et al. |
| 2015/0286827 A1 | 10/2015 | Fawaz et al. |
| 2015/0293923 A1* | 10/2015 | Eide .................. G06F 21/6254 707/749 |
| 2016/0036827 A1 | 2/2016 | Kling et al. |
| 2016/0105409 A1 | 4/2016 | Torman et al. |
| 2016/0283738 A1 | 9/2016 | Wang et al. |
| 2016/0306709 A1 | 10/2016 | Shaull |
| 2016/0335455 A1 | 11/2016 | Mohan et al. |
| 2017/0124152 A1 | 5/2017 | Nerurkar et al. |
| 2017/0126694 A1 | 5/2017 | Nerurkar et al. |
| 2017/0169253 A1* | 6/2017 | Curcio ............... G06F 21/6263 |
| 2017/0235974 A1 | 8/2017 | Zhang et al. |
| 2017/0316391 A1 | 11/2017 | Peikert et al. |
| 2017/0359364 A1 | 12/2017 | Thakurta et al. |
| 2018/0039674 A1 | 2/2018 | Seyvet et al. |
| 2018/0239924 A1 | 8/2018 | Rickard, Jr. et al. |
| 2018/0329952 A1 | 11/2018 | Ramachandra et al. |
| 2018/0349384 A1 | 12/2018 | Nerurkar et al. |
| 2019/0065775 A1* | 2/2019 | Klucar, Jr. ........ G06F 16/24552 |
| 2019/0147188 A1 | 5/2019 | Benaloh et al. |
| 2019/0318121 A1* | 10/2019 | Hockenbrocht .... G06F 16/2456 |
| 2020/0279054 A1* | 9/2020 | Pihur ...................... G06F 17/18 |
| 2020/0327252 A1* | 10/2020 | McFall ............... G06F 21/6254 |
| 2021/0064610 A1* | 3/2021 | Burchard ............ G06F 21/6227 |
| 2021/0133590 A1* | 5/2021 | Amroabadi .............. G06N 3/04 |
| 2021/0141922 A1* | 5/2021 | Yin ..................... G06F 21/6254 |
| 2021/0173856 A1* | 6/2021 | Chitnis ............... G06F 21/6227 |
| 2021/0233395 A1* | 7/2021 | Rocha .................. G08G 1/0112 |
| 2021/0256151 A1 | 8/2021 | Damewood et al. |
| 2022/0027516 A1* | 1/2022 | Umeda ................. G06F 21/552 |
| 2022/0215116 A1* | 7/2022 | Zhang .................... G06F 17/11 |

FOREIGN PATENT DOCUMENTS

| | | |
|---|---|---|
| CN | 108537055 | 9/2018 |
| CN | 110198302 A | 9/2019 |
| EP | 3866042 | 8/2021 |
| EP | 3866042 | 7/2022 |
| WO | 2015090445 | 6/2015 |
| WO | 2015157020 | 10/2015 |
| WO | 2017187207 | 11/2017 |

OTHER PUBLICATIONS

European Patent Office, Extended European Search Report, European Patent Application No. 19785548.9, dated Dec. 10, 2021, 10 pages.

European Patent Office, Extended European Search Report, European Patent Application No. 19889515.3, dated Jun. 24, 2022, seven pages.

Gaboardi, M et al. "PSI: A Private Data Sharing Interface." arXiv Preprint arXiv:1609.04340v3, Aug. 4, 2018, pp. 1-35.

Metoui, N. et al. "Differential Privacy Based Access Control." OTM 2016: On the Move to Meaningful Internet Systems, Oct. 18, 2016, pp. 962-974.

Mironov, I. "Renyi Differential Privacy." arXiv Preprint arXiv:1702.07476v3, Aug. 25, 2017, pp. 1-13.

Saranya, R. et al. "Precision-Constrained Privacy Preserving Role-Based Access Control." International Journal of Emerging Technology in Computer Science & Electronics, vol. 13, No. 1, Mar. 2015, pp. 405-408.

"European Application Serial No. 16862625.7, Extended European Search Report dated Mar. 27, 2019", 9 pgs.

"International Application Serial No. PCT US2019 015035, International Search Report dated Jun. 20, 2019", 2 pgs.

"International Application Serial No. PCT US2019 015035, Written Opinion dated Jun. 20, 2019", 3 pgs.

"European Application Serial No. 20173244.3, Extended European Search Report dated Sep. 14, 2020", 11 pgs.

"European Application Serial No. 20153847.7, Extended European Search Report dated Apr. 30, 2020", 11 pgs.

"International Application Serial No. PCT US2016 044178, International Search Report dated Oct. 18, 2016", 3 pgs.

"International Application Serial No. PCT US2016 044178, Written Opinion dated Oct. 18, 2016", 7 pgs.

"U.S. Appl. No. 17/173,936, Non Final Office Action dated Feb. 2, 2022", 10 pgs.

"Canadian Application Serial No. 3108956, Office Action dated Feb. 18, 2022", 3 pgs.

(56) References Cited

OTHER PUBLICATIONS

"Canadian Application Serial No. 3108956, Response filed May 30, 2022 to Office Action dated Feb. 18, 2022", 17 pgs.
"European Application Serial No. 21156590.8, Extended European Search Report dated Jun. 22, 2021", 5 pgs.
"European Application Serial No. 21156590.8, Intention to Grant dated Feb. 15, 2022", 34 pgs.
"European Application Serial No. 21156590.8, Response filed Jun. 9, 2022 to Intention to Grant dated Feb. 15, 2022", 7 pgs.
Agrawal, R., "Privacy-Preserving Data Mining", ACM SIGMOD, (May 2000), pp. 439-450.
Amirbekyan, A., "Privacy-Preserving Regression Algorithms", Proceedings of the 7th WSEAS International Conference on Simulation, Modeling, and Optimization, (2007), 37-45.
Beigi, G, "Privacy in Social Media: Identification, Mitigation and Applications", ACM Trans. Web, vol. 9, No. 4, Article 39, (Jul. 2018), 1-36.
Bost, R., "Machine Learning Classification over Encrypted Data", NDSS '15, (Feb. 8-11, 2015), 1-14.
Chaudhuri, K., "Privacy-preserving logistic regression", Advances in Neural Information Processing Systems, (2009), 8 pages.
Cock, M. D, "Fast, Privacy Preserving Linear Regression over Distributed Datasets based on Pre-Distributed Data", Proceedings of the 8th ACM Workshop on Artificial Intelligence and Security, (2015), 3-14.
Dankar, Fidak, "Practicing Differential Privacy in Health Care: A Review", Transactions on Data Privacy 5, [Online]. Retrieved from the Internet: URL: http: www.tdp.cat issues11 tdp.a129a13.pdf, (2013), 35-67.
Du, Wenliang, "Privacy-Preserving Multivariate Statistical Analysis: Linear Regression and Classification", Electrical Engineering and Computer Science. Paper 12, Proceedinqs of the 2004 SIAM International Conference on Data Mininq, [Online]. Retrieved from the Internet:URL: https: surface.syr.edu cgi viewcontent.cgi?referer=andhttpsredir=1andarticle=1011andcontext=eecs, (Jan. 1, 2004), 222-233.
Dwork, C., "Calibrating noise to sensitivity in private data analysis", In Proceedings of the Third Conference on Theory of Cryptography, ser. TCC'06. Berlin, Heidelberg: Springer-Verlag, [Online] Retrieved from the internet:http: dx.doi.org 10.1007 1168187814, (2006), 265-284.
Dwork, C., "Differential Privacy and Robust Statistics", Proceedings of the Forty-First Annual ACM Symposium on Theory of Computing, [Online] Retrieved from the internet:http: www.stat.cmu.edu ~jingle dprs_stoc09.pdf, (Nov. 14, 2008), 41 pages.
Dwork, C., "A Firm Foundation for Private Data Analysis", Proceedings of the ACM, vol. 54, Issue 1, (Jan. 2011), 8 pages.
Dwork, Cynthia, "Differential Privacy: A Survey of Results", TAMC, LNCS 4978, Agrawal, M. et al., (eds.), (2008), 1-19.
Fang, W., "Privacy preserving linear regression modeling of distributed databases", Optimization Letters, vol. 7, (2013), pp. 807-818.
Fletcher, S, "A Differentially Private Decision Forest", Proceedings of the 13th Australasian Data Mining Conference (AusDM), Sydney, Australia, vol. 168, (2015), 99-108.
Frades, M R, "Overview on Techniques in Cluster Analysis", Bioinformatics in Clinical Research, Methods in Molecular Biology (Methods and Protocols), vol. 593, (2010), pp. 81-107.
Fraley, C., "How Many Clusters? Which Clustering Method? Answers via Model-Based Cluster Analysis", The Computer Journal, vol. 41, No. 8, (1998), 578-588.
Friedman, A., "Data Mining with Differential Privacy", Proceedings of the 16th ACM SIGKDD International Conference on Knowledge Discovery and Data Mining, [Online] Retrieved from the internet:http: users.cis.flu.edu~lzhen001 activities KDD_USB_key_2010 docs p493.pdf, (Dec. 2010), 10 pages.
Geumlek, J, "Renyi Differential Privacy Mechanisms for Posterior Sampling", NIPS 2017: Advances in Neural Information Processing Systems 30, (Oct. 2, 2017), 1-34.
Han, S., "Privacy-Preserving Gradient-Descent Methods", IEEE Transactions on Knowledge and Data Engineering, vol. 22, No. 6,, (Jun. 2010), pp. 884-899.
Huang, Yiqing, "Telco Churn Prediction with Big Data", Proceedings of the 2015 ACM SIGMOD International Conference on Management of Data, [Online] Retrieved from the internet:http: users.wpi.edu ~yli15 Includes SIGMOD15Telco.pdf, (Jun. 4, 2015), 13 pgs.
Jagannathan, G., "A Practical Differentially Private Random Decision Tree Classifier", International Conference on Data Mining Workshops, Proceedings of the ICDM International Workshop on the Privacy Aspects of Data Mining, (2009), 8 pages.
Jayaraman, B., "Evaluating Differentially Private Machine Learning in Practice", 28th USENIX Security Symposium, (Feb. 2019), 1-18.
Ji, Z., "Differential Privacy and Machine Learning: a Survey and Review", Cornell University Library—arXiv preprint, [Online] Retrieved from the internet:http: arxiv.org pdf 1412.7584.pdf, (Dec. 24, 2014), 30 pages.
Kellaris, G, "Practical differential privacy via grouping and smoothing", Proceedings of the VLDB Endowment vol. 6, No. 5, (Mar. 1, 2013), 301-312.
Koufogiannis, F., "Gradual Release of Sensitive Data under Differential Privacy", Cornel University,CrvDtoaraDhv and Securitv,, (Oct. 15, 2018), 1-22.
Liu, H, "Privacy-Presenting Monotonicity of Differential Privacy Mechanisms", Applied Sciences, vol. 8,No. 11, (Oct. 28, 2018), 1-32.
Nissim, K., "Smooth Sensitivity and Sampling in Private Data Analysis", Proceedings of the Thirty-Ninth Annual ACM Symposium on Theory of Computing, [Online]. Retrieved from the Internet:http: www.cse.psu.edu ~sxr48 pubs smooth-sensitivity-stoc.pdf, (Jun. 11-13, 2007), 75-84.
Patil, A., "Differential Private Random Forest", International Conference on Advances in Computing, Communications and Informatics, [Online] Retrieved from the internet:http: ieeexplore.ieee.org stamp stamp.jsp?tp-andarnumber=6968348andisnumber=6968191, (Sep. 27, 2014), 9 pages.
Peng, S., "Query Optimization for Differentially Private Data Management Systems", ICDE Conference, (2013), pp. 1093-1104.
Sanil, Ashish P, "Privacy Preserving Regression Modelling via Distributed Computation", Proceedings of the Tenth ACM SIGKDD International Conference on Knowledge Discovery and Data Mining, (2004), 677-682.
Shang, S, "The Application of Differential Privacy for Rank Aggregation: Privacy and Accuracy", 17th International Conference on Information Fusion, (Jul. 7, 2014), 1-7.
Xiao, X., "iReduct: Differential Privacy with Reduced Relative Errors", SIGMOD' 11, (Jun. 12-16, 2011), 229-240.
Xiao, X., "Differential privacy via wavelet transforms", IEEE Transactions on Knowledge and Data Engineering, vol. 23, No. 8, (Aug. 2011), pp. 1200-1214.
Xu, J., "Differentially Private Histogram Publication", IEEE 28th International Conference on Data Engineering, (Apr. 2012), 32-43.
Zhang, J., "Functional Mechanism: Regression Analysis under Differential Privacy", Proceedings of the VLDB Endowment, vol. 5, No. 11, (2012), pp. 1364-1375.
Zhang, N., "Distributed Data Mining with Differential Privacy", IEEE ICC proceedings, (2011), 5 pages.

* cited by examiner

200

| Entry # | Feature 1 (cm) | Feature 2 (residence) |
|---|---|---|
| 1 | 163 | Italy |
| 2 | 136 | England |
| 3 | 180 | France |
| 4 | 347 | USA |
| 5 | 388 | China |
| 6 | 145 | France |
| 7 | 169 | Korea |
| 8 | 158 | USA |

| Feature 10 (age) | Feature 11 (Disease) |
|---|---|
| 37 | 0 |
| 87 | 0 |
| 54 | 1 |
| 34 | 0 |
| 18 | 0 |
| 13 | 1 |
| 65 | 1 |
| 17 | 1 |

...

400

Receive, from a client, a request to perform a query on a set of data, the query comprising a target accuracy and a maximum privacy spend
410

Perform a differentially private count operation on the set of data to produce a differentially private result
420

Iteratively calibrate noise injected into the differentially private result until the target accuracy is satisfied or the maximum privacy spend is used
430

Send, to the client, the differentially private result
440

FIG. 4

ADAPTIVE DIFFERENTIALLY PRIVATE COUNT

CROSS REFERENCE TO RELATED APPLICATIONS

This application is a continuation of U.S. patent application Ser. No. 17/173,936, filed Feb. 11, 2021, which claims the benefit of U.S. Patent Application No. 62/975,160, filed Feb. 11, 2020, both of which are incorporated by reference herein.

BACKGROUND

Field of Disclosure

The present invention generally relates to computer database security and in particular to increasing differentially private database performance by bounding database query privacy spend.

Description of the Related Art

Data about people, such as health data, financial records, location information, web browsing, and viewing habits, is valuable for analysis and collaboration. There are many technologies in which statistical or predictive analysis of personal data is beneficial. For example, medical research institutions use medical information about populations of individuals to support epidemiologic studies. Map providers use location information gathered from mobile devices carried by people to determine traffic information and provide routing guidance. Technology companies collect information describing behaviors of Internet users to improve their offerings, such as by redesigning user interfaces to improve human-computer interactions, making improved recommendations, and offering sponsored messages.

However, the personal nature of this data limits its usefulness. Government regulations provide strict rules about how personal data can be collected, used, and shared. Individuals also have expectations about how their personal data will be used, and may react negatively if it is publicly disclosed. As a result, companies that collect and maintain personal data seek ways to extract value from it without running afoul of such rules and expectations.

One set of techniques for using personal data involves removing personally-identifiable information from the data through masking, hashing, anonymization, aggregation, and tokenization. These techniques tend to be resource intensive and may compromise analytical utility. For example, data masking may remove or distort data, compromising the statistical properties of the data. These techniques also often fail to protect individual privacy.

An additional technique makes use of differential privacy. Differential privacy is technology that injects noise into results provided by statistical databases in order to protect private information. Within this technological space, issues arise over how to evaluate the privacy impact of the injected noise. The answer can be complex due to the potential resources available to determined adversaries (e.g., the computing power available to a potential attacker trying to gain access to the private data), the resources (e.g., computing power) available to the database, and the types of queries supported by the database.

A differentially private system provides differentially private results in response to database queries. The amount of private information provided by the system may depend, in part, on a "privacy budget" that describes an amount of privacy that may be "spent" to retrieve information from the database. It is important for the differentially private system to calculate privacy spend correctly because it directly impacts the analytical utility of the information in the database. It is likewise important to for the system to minimize privacy spend to the extent possible in order to provide privacy budget for additional queries for the same reason.

SUMMARY

A differentially private security system communicatively coupled to a database storing restricted data receives a database query from a client. The database query includes an operation, a target accuracy, and a maximum privacy spend for the query. The system performs the operation to produce a result, then injects the result with noise sampled from a Laplace distribution to produce a differentially private result. The system iteratively calibrates the noise value of the differentially private result using a secondary distribution different from the Laplace distribution and a new fractional privacy spend. The system ceases to iterate when an iteration uses the maximum privacy spend or a relative error of the differentially private result is determined to satisfy the target accuracy, or both. The system sends the differentially private result to the client.

Calibrating the noise value of the differentially private result using the secondary distribution different from the Laplace distribution and the new fractional privacy spend larger than the one or more fractional privacy spends of one or more earlier iterations involves the system generating the new fractional privacy spend such that it is larger than any fractional privacy spends of preceding iterations. The system generates a new noise value sampled from the secondary distribution using the new fractional privacy spend. The system incorporates the new noise value into the differentially private result. The system then checks whether the calibrated differentially private result satisfies the target accuracy. Checking whether the calibrated differentially private result satisfies the target accuracy involves determining a relative error of the differentially private result using an error estimator and then determining whether the relative error is, at most, the target accuracy.

BRIEF DESCRIPTION OF DRAWINGS

FIG. 4 illustrates a process for executing a query with adaptive differential privacy, according to one embodiment.

The figures depict embodiments of the invention for purposes of illustration only. One skilled in the art will readily recognize from the following description that alternative embodiments of the structures and methods illustrated herein may be employed without departing from the principles of the invention described herein.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality.

System Overview

Figure 1:
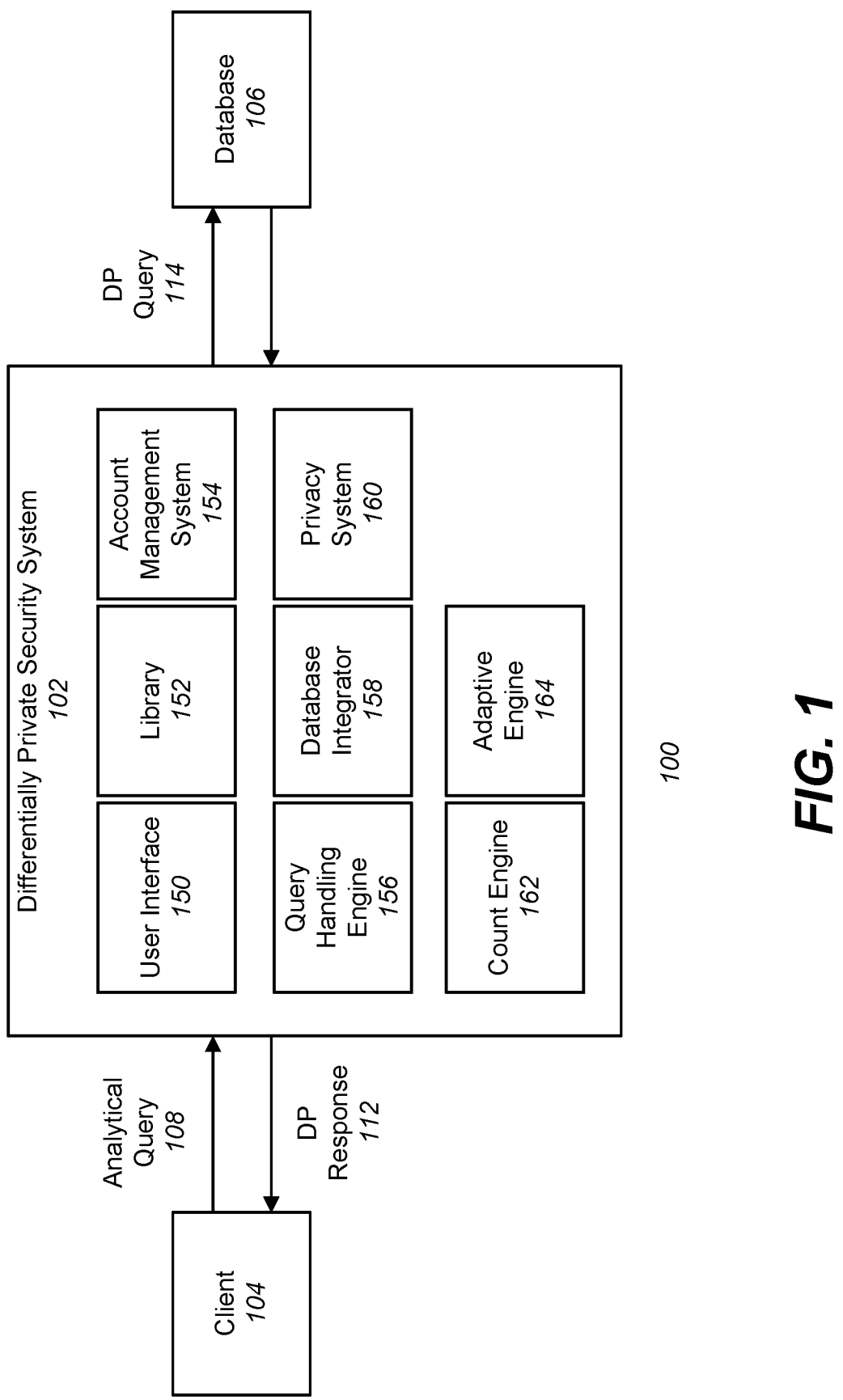
FIG. 1 illustrates a system for receiving a query for a database and responding to the query by executing the query in a differentially private manner, according to one embodiment.

FIG. 1 is a system 100 for receiving a query 108 for a database 106 and responding to the query 108 by executing the query in a differentially private (DP) manner, according to one embodiment. The system 100 includes a differentially private security system (DP system) 102 that receives an analytical query 108 from a client 104 and applies a DP version of the query 114 on the database 106. Subsequently, the DP system 102 returns the response of the DP query 114 to the client 104 as the DP response 112.

The database 106 is one or more databases managed by one or more entities. The database 106 may be managed by the same entity that manages the DP system 102 or by a different entity. The database 106 stores at least some restricted data. The restricted data may be represented as rows of records, with each record having a set of columns holding values pertaining to the record.

Restricted data is data to which access and/or usage is limited due to legal, contractual, and/or societal concerns. Examples of restricted data include health data of patients and financial records of people, businesses or other entities. Similarly, restricted data may include census data or other forms of demographic data describing people, businesses, or other entities within geographic areas. Restricted data also includes usage data describing how people interact with electronic devices and/or network-based services. For example, restricted data may include location data describing geographic movements of mobile devices, consumption history data describing how and when people consume network-based content, and the particular content consumed (e.g., music and/or video content), and messaging data describing when and to whom users send messages via mobile or other electronic devices.

A client 104 is used to access the restricted data in the database 106. A client 104 is an electronic device such as a desktop, laptop, or tablet computer or a smartphone used by a human user to access the database 106. The client 104 and user may be, but are not necessarily, associated with the entities that manage the database 106 and/or DP system 102. Users of the client 104 include administrators and analysts. Administrators use the clients 104 to access the DP system 102 and/or database 106 to perform administrative functions such as provisioning other users and/or clients 104, and configuring, maintaining, and auditing usage of the system and/or database. The administrators may access the DP system 102 and database 106 directly via administrative interfaces that allow users with appropriate credentials and access rights to perform the administrative functions.

Analysts use the clients 104 to apply analytical queries 108 to the restricted data in the database 106. The clients 104 used by the analysts access the database 106 only through the DP system 102. Depending upon the embodiment, the analyst and/or client 104 may have an account provisioned by an administrator which grants the analyst or client certain rights to access the restricted data in the database 106.

The rights to the restricted data may be specified in terms of a privacy budget. The privacy budget describes limits on how much of the restricted data can be released. In one embodiment, the privacy budget is a numerical value representative of a number and/or type of remaining queries 108 available, or a degree of information which can released about data, e.g., data in a database or accessible by the DP system 102. The privacy budget may be specified in terms of a query, analyst, client 104, entity, globally, and/or time period. For example, the privacy budget may specify limits for an individual query, with each query having a separate budget. The privacy budget may also specify limits for an analyst or client, in which case the budget is calculated cumulatively across multiple queries from a client or analyst. For a privacy budget specified for an entity, such as an organization having multiple clients 104 and users, the privacy budget is calculated cumulatively across the multiple queries from clients and users associated with the entity. A global privacy budget, in turn, is calculated across all queries to the database, regardless of the source of the query. The privacy budget may also specify an applicable time period. For example, the privacy budget may specify that queries from particular clients may not exceed a specified budget within a given time period, and the budget may reset upon expiration of the time period. Depending upon the embodiment, client, as used herein, may alternatively or additionally refer to a user using the client to access the DP system 102, to a user account registered with the DP system 102, to a group of users or to a group of clients 104, and/or to another entity that is a source of queries.

As discussed above, a client 104 sends an analytical query 108 to the DP system 102 and also receives a differentially private response 112 to the query from the system. The queries 108 submitted by the client 104 may be simple queries, such as count queries that request the number of entries in the databases 106 that satisfy a condition specified by the client 104, or complicated queries, such as predictive analytics queries that request a data analytics model trained on the databases 106. Specific types of queries are discussed in more detail below.

Each query has an associated set of privacy parameters. The privacy parameters indicate the amount of restricted data to release from the database 106 to the client 104 in response to the query 108. The privacy parameters likewise indicate a privacy spend, which is the amount of decrease in the relevant privacy budget (e.g., the budget for the client 104 or entity with which the client is associated) in response to performance of the query 108. In one embodiment, the client 104 specifies a set of associated privacy parameters with each submitted query 108. In other embodiments, the privacy parameters are specified in other ways. The DP system 102 may associate privacy parameters with received queries (rather than obtaining the parameters directly from the query). For example, the DP system 102 may apply a default set of privacy parameters to queries that do not specify the parameters. The values of the default privacy parameters may be determined based on the client 104, analyst, query type, and/or other factors, such as a privacy budget of the client.

The DP system 102 receives an analytical query 108 from the client 104 and returns a differentially private response 112 to the client. In one embodiment, the DP system 102 determines the privacy parameters associated with the query, and evaluates the parameters against the applicable privacy budget. Alternatively, the analytical query 108 may specify the one or more privacy parameters of the set of privacy parameters. If the analytical query 108 and associated privacy parameters exceeds the privacy budget, the DP system 102 may deny (i.e., not execute) the query. Alternatively, the DP system 102 may adjust the privacy parameters to fall within the privacy budget, and execute the query using the adjusted privacy parameters. If the privacy parameters do not exceed the privacy budget, the DP system 102 executes a DP version of the query 114 on the database 106, such that it releases a degree of restricted data from the database 106 indicated by the privacy parameters specified by the client 104, and also protects a degree of privacy of the restricted data specified by the privacy budget. For example, an administrator of the database 106 may set a privacy budget specifying a maximum threshold on the amount of restricted data released by given query 108 that the client 104 may not exceed. Thus, the DP system 102 balances privacy protection of the restricted data in the database 106 while releasing useful information on the database 106 to the client 104.

The DP query 114 applied to the database 106 by the DP system 102 is a differentially private version of the query 108 that satisfies a definition of differential privacy described in more detail with reference to the privacy system 160 in FIG. 3. The DP system 102 may apply the DP query 114 to the database 106 by transforming the analytical query 108 into one or more queries derived from the analytical query that cause the database 106 to release differentially private results. The DP system 102 may then return these differentially private results to the client as the DP response 112. The DP system 102 may also, or instead, apply the DP query 114 to the database 106 by transforming the analytical query into one or more derived queries that cause the database to release results that are not necessarily differentially private. The DP system 102 may then transform the released results in a way that enforces differential privacy to produce the DP response 112 returned to the client 104. These transformations may involve perturbing the process by which the DP query 114 is produced from the analytical query 108 and/or perturbing the results released by the database 106 with noise that provides the differential privacy specified by the privacy parameters while enforcing the privacy budget.

The DP system 102 allows an analyst to perform database queries on restricted data, and thereby perform analyses using the DP responses 112 returned by the queries, while maintaining adherence with privacy parameters and a privacy budget. In addition, the techniques used by the DP system 102 allow database queries to access restricted data in ways that do not compromise the analytical utility of the data. The DP system 102 supports a wide variety of analytical and database access techniques and provides fine-grained control of the privacy parameters and privacy budget when using such techniques. The DP system 102 thus provides an improved database system having expanded and enhanced access to restricted data relative to other database systems.

An analyst can use the DP system 102 for a variety of different purposes. In one embodiment, the restricted data in the database 106 includes training data describing features of entities relevant to a particular condition. The analyst uses the DP system 102 to build one or more differentially private machine-learned models, such as classifiers, from the training data. The analyst can apply data describing a new entity to the machine-learned models, and use the outputs of the models to classify the new entity as having, or not having the condition. However, an adversary cannot use the information in the machined-learned models to ascertain whether individual entities described by the training set have the condition due to the differentially private nature of the models.

Such models may be retained and executed within the DP system 102. For example, an analyst can issue an analytical query 108 that causes the DP system 102 to interact with the restricted data in the database 106 to build the machine-learned models. The DP system 102 can then store the models within the system or an associated system. The analyst can use a new analytical query 108 or another interface to the system 102 to apply the data describing the new entity to the models. The DP system 102 can execute the new data on the stored models and output the classification of the entity as a DP response 112. Alternatively or in addition, the DP system 102 can output the trained models as a DP response 112, and an analyst can store and apply data to the models using different systems in order to classify the entity.

Examples of the types of classifications that may be performed using such models include determining whether a person (the entity) has a medical condition. In this example, the restricted training data include health data describing patients that are labeled as having or not having a given medical condition. The analyst applies health data for a new patient to the one or more differentially private machine-learned models generated from the restricted training data in order to diagnose whether the new patient has the medical condition.

Another example classification that may be performed using such models involves identifying fraudulent or otherwise exceptional financial transactions. In this example, the restricted training data includes financial transaction data associated with one or more people or institutions, where the transactions are labeled as being exceptional or not exceptional. The analyst applies financial transaction data for a new transaction to the one or more differentially private machine-learned models generated from the restricted training data in order to determine whether the new transaction is exceptional. The analyst can block, flag, or otherwise report an exceptional transaction.

As shown in FIG. 1, the DP system 102 includes a user interface 150, a library 152, an account management system 154, a query handling engine 156, a data integration module 158, a privacy system 160, a count engine 162, and an adaptive engine 164. Some embodiments of the DP system 102 have different or additional modules than the ones described here. Similarly, the functions can be distributed among the modules in a different manner than is described here. Certain modules and functions can be incorporated into other modules of the DP system 102.

The user interface 150 generates a graphical user interface on a dedicated hardware device of the DP system 102 or the client 104 in which the client 104 can submit an analytical query 108 and the desired privacy parameters, view the DP response 112 in the form of numerical values or images, and/or perform other interactions with the system. The client 104 may also use the graphical user interface to inspect the database 106 schemata, view an associated privacy budget, cache the DP response 112 to view the response later, and/or perform administrative functions. The user interface 150 submits properly formatted query commands to other modules of the DP system 102.

The library 152 contains software components that can be included in external programs that allow the client 104 to submit the analytical query 108, receive the DP response 112, and other functions within a script or program. For example, the client 104 may use the software components of the library 152 to construct custom data analytic programs. Each of the software components in the library 152 submits properly formatted query commands to other modules of the DP system 102.

The account management system 154 receives properly formatted query commands (herein "query commands" or "QC"), parses the received query commands, and verifies that the commands are syntactically correct.

Examples of query commands accommodated by the DP system 102, according to one embodiment, are listed below.

QC1. Count
'SELECT COUNT (<column>) FROM <database.table> WHERE <where_clause> BUDGET <eps><delta>.
QC2. Median
'SELECT MEDIAN (<column>) FROM <database.table> WHERE <where_clause> BUDGET <eps><delta>.
QC3. Mean
'SELECT MEAN (<column>) FROM <database.table> WHERE <where_clause> BUDGET <eps><delta>.
QC4. Variance
'SELECT VARIANCE (<column>) FROM <database.table> WHERE <where_clause> BUDGET <eps><delta>.
QC5. Inter-Quartile Range
'SELECT IQR (<column>) FROM <database.table> WHERE <where_clause> BUDGET <eps><delta>.
QC6. Batch Gradient Descent
'SELECT <GLM> (<columns_x>,<column_y>, <params>) FROM <database.table> WHERE <where_clause> BUDGET <eps><delta>.
QC7. Stochastic Gradient Descent
'SELECT SGD <GLM> (<column>) FROM <database.table> WHERE <where_clause> BUDGET <eps><delta>.
QC8. Random Forest
'SELECT RANDOMFOREST (<columns_x>,<columns_y>) FROM <database.table> WHERE <where_clause> BUDGET <eps><delta>.
QC9. Histogram
'SELECT HISTOGRAM (<column>) FROM <database.table> WHERE <where_clause_i> BUDGET <eps><delta>.

The query handling engine 156 transforms the received query commands into appropriate function calls and database access commands by parsing the query command string. The function calls are specific to the query 108 requested by the client 104, and the access commands allow access to the required database 106. Different databases 106 require different access commands. The access commands are provided to the database integrator 158.

The database integrator 158 receives the access commands to one or more databases 106, collects the required databases, and merges them into a single data object. The data object has a structure similar to that of a database structure described in reference to FIG. 2. The data object is provided to the privacy system 160.

The privacy system 160 receives the data object from the database integrator 158, appropriate function calls from the query handling engine 156 indicating the type of query 108 submitted by the client 104, and privacy parameters specified for the query 108. The privacy system 160 evaluates the privacy parameters against the applicable privacy budget and either denies or allows the query. If the query is denied, the privacy system 160 outputs a response indicating that the query did not execute. If the query is allowed, the privacy system 160 executes the query and outputs a DP response 112 to a differentially private version of the query 108 with respect to the database 106. The privacy system 160 also decrements the applicable privacy budget to account for the executed query. The privacy system 160 uses differential privacy engines in the DP System 102, such as the count engine 162 and/or the adaptive engine 164, to execute the query. In an embodiment, the count engine 162 and/or adaptive engine 164 are components of the privacy system 160.

The count engine 162 generates a differentially private result in response to a query to count a set of data in the database 106, as described in greater detail below.

The adaptive engine 164 executes a query such that the DP system 102 pursues a target accuracy for results of the query. A target accuracy is specified in terms of a relative error. The target accuracy for a query is met if the differentially private result of the query has a relative error less than or equal to the target accuracy.

Relative error is the discrepancy between an exact value and an approximation of the exact value, in terms of a percentage. Specifically, relative error is:

$$\rho = \left| \frac{v_E - v_A}{v_E} \right| * 100\%$$

Where $\rho$ is the relative error, $v_E$ is the exact value, and $v_A$ is the approximation. For example, assume a database stores information about patients in a hospital. A count query executed on the database requests a count of all patients in the hospital named Charles. The actual number of patients named Charles may be 100, but the DP system 102 provides a differentially private result with a value of 90. Here, $v_E$=100 and $v_A$=90. As such, the relative error $\rho$ is 10%. This indicates that the differentially private result, 90, is 10% off from the exact value, 100.

A query executed by the adaptive engine 164 is an adaptive query that specifies a maximum privacy spend in terms of one or more privacy parameters, such as ε as described below, and a target accuracy in terms of a relative error percentage. For example, an adaptive query may specify a maximum privacy spend of ε=1 and a target accuracy of 10%. The adaptive query also specifies one or more operations to perform on data and one or more relations indicating the data on which the adaptive engine 164 is to perform the one or more operations.

The adaptive engine 164 performs the operations and iteratively adjusts the noise added to the results, then checks whether the adjusted results of the operations satisfy the target accuracy. Each iteration uses a fraction of the maximum privacy spend. If the results of the operations at a given iteration do not satisfy the target accuracy, the adaptive engine 164 performs another iteration using a larger portion of the maximum privacy spend. The adaptive engine 164 ceases iterating when either the maximum privacy spend is spent or the target accuracy is achieved. For example, after a first iteration, 1/100 of the maximum privacy spend has been used and the results have a relative error of 20%, greater than a target accuracy of 10% relative error. As such, the adaptive engine 164 performs an additional iteration, spending 1/50 the maximum privacy spend. If the results of this second iteration have a relative error of 9%, the adaptive engine 164 ceases to iterate and provides the results of the second iteration to the client 104, as their relative error is within the target accuracy of 10%.

Using the techniques described herein, the DP system 102 can provide differentially private results that satisfy a target accuracy while minimizing the privacy spend. As such, the DP system 102 can avoid providing results that lack analytical utility due to a high amount of noise injected into the results. Simultaneously, the DP system 102 can avoid overspending privacy parameters to produce results for a query.

Figures 2, 3:
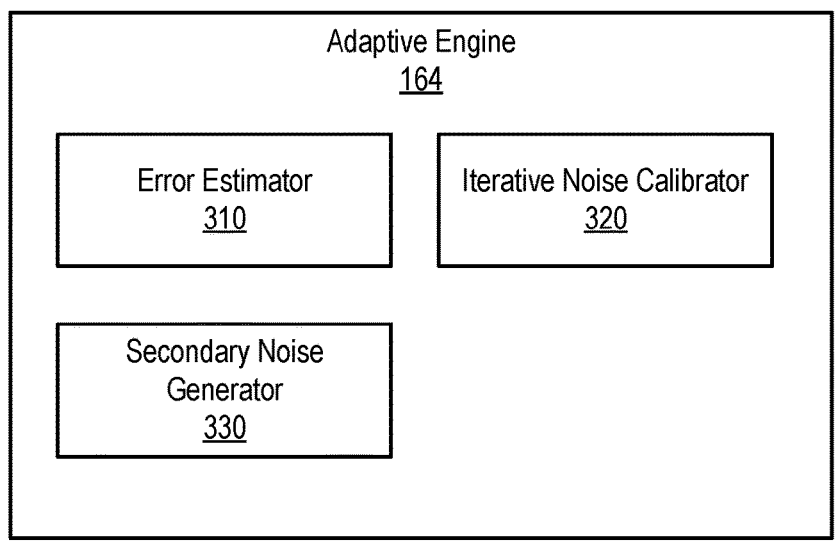
FIG. 2 illustrates an example database structure, according to one embodiment.
FIG. 3 illustrates an adaptive engine, according to one embodiment.

FIG. 2 illustrates an example database structure, according to one embodiment. The database 200 includes a data table, which may be referred to as a matrix, with a number of rows and columns. Each row is an entry of the database and each column is a feature of the database. Thus, each row contains a data entry characterized by a series of feature values for the data entry. For example, as shown in FIG. 2, the example database 200 contains a data table with 8 entries and 11 features, and illustrates a list of patient profiles. Each patient is characterized by a series of feature values that contain information on the patient's height (Feature 1), country of residence (Feature 2), age (Feature 10), and whether the patient has contracted a disease (Feature 11). A row is also referred to as a "record" in the database 106. The database 106 may include more than one data table. Henceforth a data table may be referred to as a "table."

The feature values in the database 200 may be numerical in nature, e.g., Features 1 and 10, or categorical in nature, e.g., Features 2 and 11. In the case of categorical feature values, each category may be denoted as an integer. For example, in Feature 11 of FIG. 2, "0" indicates that the patient has not contracted a disease, and "1" indicates that the patient has contracted a disease.

Definition of Differential Privacy

For a given query 108, the privacy system 160 receives a data object X, function calls indicating the type of query 108, privacy parameters specified by the client 104, and outputs a DP response 112 to a differentially private version of the query 108 with respect to X. Each data object X is a collection of row vectors $x_{i=1, 2, \ldots, m}$, in which each row vector $x_i$ has a series of p elements $x_i^{j=1, 2, \ldots, p}$.

A query M satisfies the definition of ε-differential privacy if for all:

$$\forall\, X, X' \in \mathbb{D},\, \forall\, S \subseteq \text{Range}(M): \frac{Pr[M(X) \in S]}{Pr[M(X') \in S]} \leq e^\varepsilon$$

where $\mathbb{D}$ is the space of all possible data objects, S is an output space of query M, and neighboring databases are defined as two data objects X, X' where one of X, X' has all the same entries as the other, plus one additional entry. That is, given two neighboring data objects X, X' in which one has an individual's data entry (the additional entry), and the other does not, there is no output of query M that an adversary can use to distinguish between X, X'. That is, an output of such a query M that is differentially private reveals little to no information about individual records in the data object X. The privacy parameter ε controls the amount of information that the query M reveals about any individual data entry in X, and represents the degree of information released about the entries in X. For example, in the definition given above, a small value of ε indicates that the probability an output of query M will disclose information on a specific data entry is small, while a large value of ε indicates the opposite.

As another definition of differential privacy, a query M is (ε,δ)-differentially private if for neighboring data objects X, X':

$$\forall\, X, X' \in \mathbb{D},\, \forall\, S \subseteq \text{Range}(M): \frac{Pr[M(X) \in S]}{Pr[M(X') \in S]} \leq e^\varepsilon + \delta.$$

The privacy parameter δ measures the improbability of the output of query M satisfying ε-differential privacy. As discussed in reference to FIG. 1, the client 104 may specify the desired values for the privacy parameters (ε, δ) for a query 108.

There are three important definitions for discussing the privacy system 160: global sensitivity, local sensitivity, and smooth sensitivity. Global sensitivity of a query M is defined as $$GS_M(X) = \max_{X, X': d(X, X')=1} \|M(X) - M(X')\|$$

where X, X' are any neighboring data objects, such that d(X, X')=1. This states that the global sensitivity is the most the output of query M could change by computing M on X and X'.

The local sensitivity of a query M on the data object X is given by:

$$LS_M(X) = \max_{X': d(X, X')=1} \|M(X) - M(X')\|$$

where the set {X': d(X, X')=1} denotes all data objects that have at most one entry that is different from X. That is, the local sensitivity $LS_M(X)$ is the sensitivity of the output of the query M on data objects X' that have at most one different entry from X, measured by a norm function.

Related to the local sensitivity $LS_M(X)$, the smooth sensitivity given a parameter β is given by:

$$S_M(X; \beta) = \max_{X' \in \mathbb{D}} \|LS_M(X) \cdot e^{-\beta \cdot d(X, X')}\|$$

where d(X, X') denotes the number of entries that differ between X and X'.

Notation for Random Variables

The notation in this section is used for the remainder of the application to denote the following random variables.

1) $G(\sigma^2)$, denotes a zero-centered Gaussian random variable with the probability density function $$f(x \mid \sigma^2) = \frac{1}{\sigma\sqrt{2\pi}} e^{-\frac{x^2}{2\sigma^2}}.$$

2) L(b) denotes a zero-centered Laplacian random variable from a Laplace distribution with the probability density function $$f(x|b) = \frac{1}{2b}e^{-\frac{|x|}{b}}.$$

3) $C(\gamma)$ denotes a zero-centered Cauchy random variable with the probability density function $$f(x|\gamma) = \frac{1}{\pi\gamma\left(1+\left(\frac{x}{\gamma}\right)^2\right)}.$$

Further, a vector populated with random variables R as its elements is denoted by v(R). A matrix populated with random variables R as its elements is denoted by M(R).

Count Engine

Turning back to FIG. 1, the count engine 162 produces a DP response 112 responsive to the differentially private security system 102 receiving a query 108 for counting the number of entries in a column of the data object X that satisfy a condition specified by the client 104, given privacy parameters $\epsilon$ and/or $\delta$. An example query command for accessing the count engine 162 is given in QC1 above. For the example data object X shown in FIG. 2, the client 104 may submit a query 108 requesting a DP response 112 indicating the number of patients that are above the age of 30.

The count engine 162 retrieves the count q from X. If privacy parameter $\delta$ is equal to zero or is not used, the count engine 162 returns $$y \approx q + L\left(c_1 \cdot \frac{1}{\epsilon}\right).$$

as the DP response 112 for display by the user interface 150, where $c_1$ is a constant. An example value for $c_1$ may be 1. If the privacy parameter $\delta$ is non-zero, the count engine 302 returns $$y \approx q + G\left(c_1 \cdot 2 \cdot \log\frac{2}{\delta} \cdot \frac{1}{\epsilon^2}\right),$$

as the DP response 112 for display on the user interface 150, where $c_1$ is a constant. An example value for $c_1$ may be 1.

Adaptive Engine

FIG. 3 illustrates an adaptive engine 164, according to one embodiment. The adaptive engine 164 includes an error estimator 310, an iterative noise calibrator 320, a secondary noise generator 330, and an accuracy manager 340. The adaptive engine 164 receives an adaptive query specifying a target accuracy in terms of a relative error value and a maximum privacy spend in terms of an $\epsilon$ value. The adaptive query also specifies a count operation to be performed on a set of data. Although described herein with reference to a count operation, the adaptive engine 164 can be used with alternative operations in alternative embodiments. Upon producing a differentially private result, the adaptive engine 164 sends the differentially private result to the client 104.

The adaptive engine 164 may also send a notification identifying the relative error of the differentially private result.

The error estimator 310 approximates the relative error of a differentially private result. Depending upon the embodiment, the error estimator 310 can be a plug-in estimator or a Bayesian estimator. The error estimator 310 generates a temporary result by applying the noise used to produce the differentially private result into the differentially private result. The error estimator 310 then determines a relative error between the differentially private result and the temporary result. The adaptive engine 164 uses this relative error to approximate the relative error of the differentially private result as compared to the original result.

The iterative noise calibrator 320 iteratively calibrates the noise of a differentially private result until the differentially private result has a relative error no greater than the target accuracy or the maximum privacy spend has been used, or both. Initially, the iterative noise calibrator 320 receives an initial differentially private result from a differentially private operation, such as a differentially private count performed by the count engine 162. The received initial differentially private result is broken down into its original result and the noise value injected into the original result to provide differential privacy. The iterative noise calibrator 320 also receives an indicator of a fraction of the maximum privacy spend which was used to generate the initial differentially private result. For example, the fraction of the maximum privacy spend, the "fractional privacy spend," may be 1/100 the maximum privacy spend S, i.e., S/100.

For a given iteration, the iterative noise calibrator 320 generates a corresponding fractional privacy spend such that it is larger than any fractional privacy spends of preceding iterations. For example, if the iterative noise calibrator 320 receives an indication that the fractional privacy spend to produce the initial differentially private result was S/100, a fractional privacy spend for a first iteration may be S/50, a fractional privacy spend for a second iteration may be S/25, and so on. The fractional privacy spend of an iteration increments by a specified amount from one iteration to the next. The increment can be based on the amount of the fractional privacy spend of an immediately preceding iteration. For example, the amount by which the fractional privacy spend of one iteration increases from a previous fractional privacy spend can be a doubling of the previous fractional privacy spend.

In an embodiment, the amount by which the fractional privacy spend of one iteration increases from a previous fractional privacy spend varies proportional to the difference between the target accuracy and a relative error of a differentially private result of a preceding iteration. The function by which the fractional privacy spend increases in proportion to the difference between the target accuracy and a relative error depends upon the embodiment. As an example of the variance, a first iteration produces a differentially private result with a relative error of 20%, where the target accuracy is 10%. As such, the fractional privacy spend may double. However, if after the first iteration the differentially private result has a relative error of 12%, then the second iteration may generate a fractional privacy spend that is only 20% larger than the fractional privacy spend used in the first iteration. In this second embodiment, the amount by which the fractional privacy spend can increase from one iteration to the next may be capped. For example, the fractional privacy spend may be capped to never more than double a preceding fractional privacy spend, e.g., S/50 will never be immediately followed by a larger fractional privacy spend than S/25, regardless of what the function outputs as the increment from the one fractional privacy spend to another.

For the given iteration, the iterative noise calibrator 320 generates a new noise value by sampling the secondary noise generator 330 using the new fractional privacy spend and the fractional privacy spend of the immediately preceding iteration (or, in the case of the first iteration, the fractional privacy spend indicated as used by the operation specified in the query). This sampling is described in greater detail below with reference to the secondary noise generator 330. The iterative noise calibrator 320 incorporates the new noise value into the differentially private result by injecting the new noise value into the original result from the operation specified in the query and updating the differentially private result to the resultant value.

After incorporating the new noise into the differentially private result, the iterative noise calibrator 320 checks whether the differentially private result satisfies the target accuracy using the error estimator 310. If the differentially private result satisfies the target accuracy by being no greater than the target accuracy, the iterative noise calibrator 320 ceases to iterate and sends the differentially private result to the client 104. If the differentially private result does not satisfy the target accuracy, the iterative noise calibrator 320 proceeds to another iteration.

If an iteration cannot increase the fractional privacy spend, i.e., the fractional privacy spend equals the maximum privacy spend, the iterative noise calibrator 320 stops iterating. If so, the adaptive engine 164 may send the differentially private result to the client 104 with a notification that the target accuracy could not be reached. The notification may indicate the achieved accuracy, i.e., the relative error.

The secondary noise generator 330 produces a secondary distribution different from the distribution used to produce the initial differentially private result. In an embodiment, the secondary distribution is a four-part mixture distribution. Specifically, the four-part mixture distribution may be one part Dirac delta function, two parts truncated exponential functions, and one part exponential function. In an embodiment, the distribution is as follows, where y is the new noise value, x is the previous noise value, a previous fractional privacy spend is $\varepsilon 1$, and a new fractional privacy spend is $\varepsilon 2$:

$$\frac{\varepsilon 1}{\varepsilon 2} e^{-(\varepsilon 2-\varepsilon 1)|x|} \delta(y-x) + \frac{\varepsilon 2^2 - \varepsilon 1^2}{2\varepsilon 2} e^{-\varepsilon 1|y-x|-\varepsilon 2|y|+\varepsilon 1|x|}$$

The iterative noise calibrator 320 samples the secondary noise generator 330 to generate the new noise value for injection into the result to provide differential privacy to the result. In an embodiment, the secondary noise generator 330 is sampled as follows, where a previous noise value is x, a new noise sample is y, a previous fractional privacy spend is $\varepsilon 1$, a new fractional privacy spend is $\varepsilon 2$, and z is drawn from the secondary distribution:

switch randomly case with probability $\frac{\varepsilon 1}{\varepsilon 2} e^{-(\varepsilon 2-\varepsilon 1)|x|}$:

return y = x.

case with probability $\frac{\varepsilon 2 - \varepsilon 1}{2\varepsilon 2}$:

draw $z \sim \begin{cases} e^{(\varepsilon 1+\varepsilon 2)z}, \text{ for } z \leq 0 \\ 0, \text{ otherwise} \end{cases}$.

return y = sgn(x)z.

case with probability $\frac{\varepsilon 1 + \varepsilon 2}{2\varepsilon 2}(1 - e^{-(\varepsilon 2-\varepsilon 1)|x|})$:

draw $z \sim \begin{cases} e^{-(\varepsilon 2-\varepsilon 1)z}, \text{ for } 0 \leq z \leq |x| \\ 0, \text{ otherwise} \end{cases}$.

return y = sgn(x)z.

case with probability $\frac{\varepsilon 2 - \varepsilon 1}{2\varepsilon 2} e^{-(\varepsilon 2-\varepsilon 1)|x|}$:

draw $z \sim \begin{cases} e^{-(\varepsilon 1+\varepsilon 2)z}, \text{ for } z \geq |x| \\ 0, \text{ otherwise} \end{cases}$.

return y = sgn(x)z.
end switch

Processes

FIG. 4 illustrates a process for executing a query with adaptive differential privacy, according to one embodiment. The DP system 102 receives 410, from the client 104, a request to perform a query on a set of data. The query includes a target accuracy and a maximum privacy spend for the query. The DP system 102 performs 420 an operation to produce a result, such as a count operation, then injects the result with noise sampled from a Laplace distribution based on a fraction of the maximum privacy spend to produce a differentially private result.

The DP system 102 iteratively calibrates 430 the noise value of the differentially private result using a secondary distribution different from the Laplace distribution and a new fractional privacy spend. The new fractional privacy spend is generated to be larger than any fractional privacy spends of preceding iterations. The DP system 102 generates a new noise value sampled from the secondary distribution and incorporates it into the differentially private result to calibrate the noise of the differentially private result. The DP system 102 determines whether the calibrated differentially private result satisfies the target accuracy by determining a relative error of the calibrated differentially private result using an error estimator and comparing the relative error to the target accuracy. If the relative error is at most the target accuracy, the differentially private result satisfies the target accuracy.

The DP system 102 iterates until an iteration uses the maximum privacy spend or a relative error of the differentially private result is determined to satisfy the target accuracy, or both. The DP system 102 then sends 440 the differentially private result to the client 104 in response to the query. The DP system 102 may also send the relative error of the differentially private result to the client 104.

Computing Environment

Figure 5:
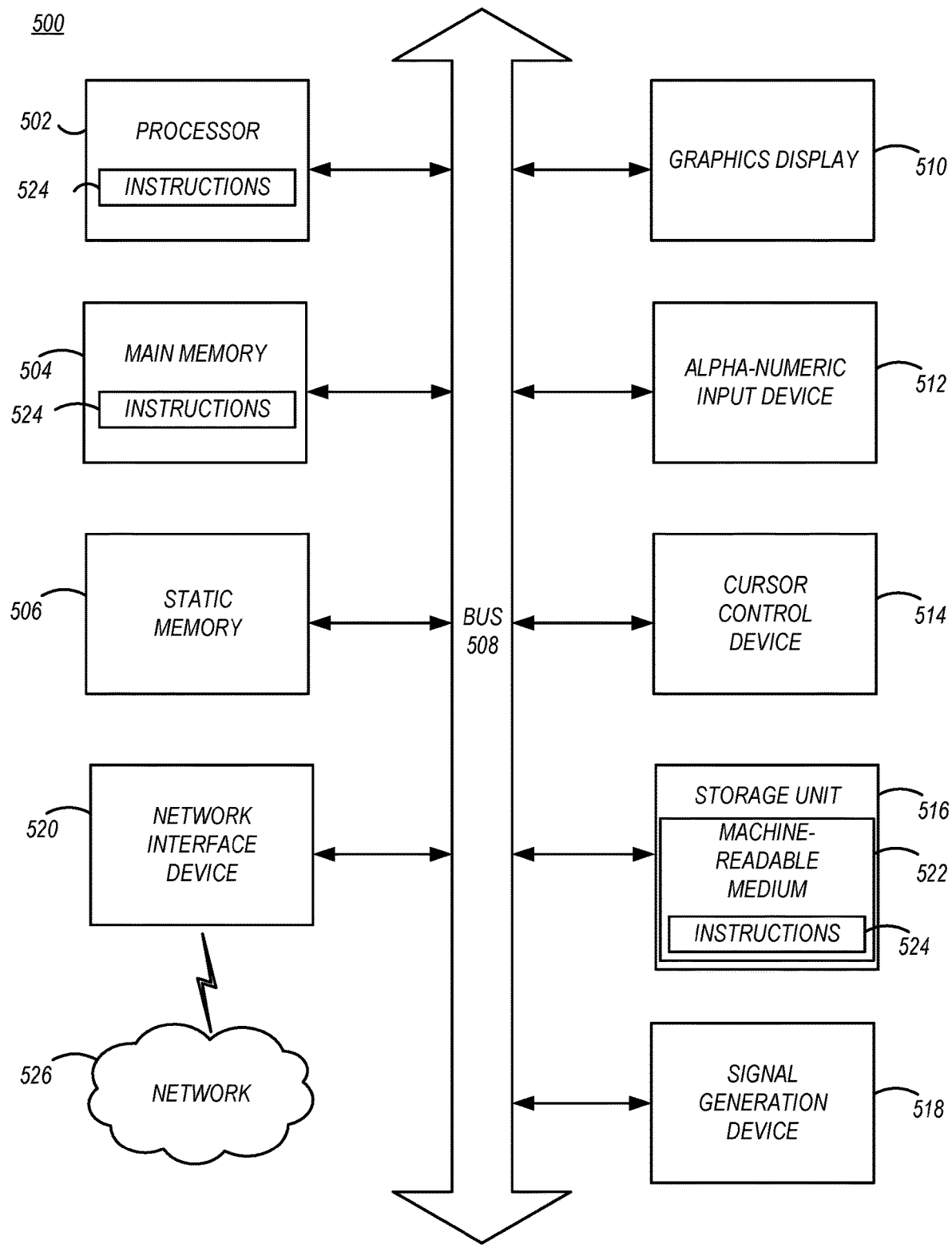
FIG. 5 is a block diagram illustrating components of an example machine able to read instructions from a machine readable medium and execute them in a processor or controller, according to one embodiment.

FIG. 5 is a block diagram illustrating components of an example machine able to read instructions from a machine readable medium and execute them in a processor or controller, according to one embodiment. Specifically, FIG. 5 shows a diagrammatic representation of a machine in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504 and the storage unit 516 communicate via a bus 508.

In addition, the computer system 506 can include a static memory 506, a display driver 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

The invention claimed is:

1. A method for performing an adaptive differentially private count operation on a set of data stored by a database, the method comprising:
receiving a request from a client device to perform a query on the set of data stored by the database, the request identifying a target accuracy and a maximum privacy spend;
performing a count operation on the set of data to produce a result;
perturbing the result to produce a differentially private result using a noise value, the noise value being sampled from a first probability distribution based on a fractional privacy spend, the fractional privacy spend comprising a first fraction of the maximum privacy spend;
iteratively calibrating the noise value of the differentially private result based on a secondary distribution different from the first probability distribution and based on a new fractional privacy spend, the new fractional privacy spend comprising a second fraction of the maximum privacy spend, the new fractional privacy spend being larger than fractional privacy spends of preceding iterations, the iterations of calibrating the noise value occurring until
a relative error of the differentially private result is less than or equal to the target accuracy; and
sending, to the client device, the differentially private result.

2. The method of claim 1, wherein iteratively calibrating the noise value of the differentially private result based on the secondary distribution comprises, for an iteration:
generating the new fractional privacy spend larger than the fractional privacy spends of preceding iterations;
generating a new noise value sampled from the secondary distribution based on the new fractional privacy spend;
incorporating the new noise value into the differentially private result; and
determining whether the differentially private result is less than or equal to the target accuracy.

3. The method of claim 2, wherein determining whether the differentially private result is less than or equal to the target accuracy comprises:
estimating the relative error of the differentially private result; and
comparing the relative error to the target accuracy.

4. The method of claim 2, wherein the new fractional privacy spend is generated as a multiple of a preceding fractional privacy spend of a preceding iteration.

5. The method of claim 2, wherein the new fractional privacy spend is generated as a function of a difference between the target accuracy and the relative error of the differentially private result of a preceding iteration.

6. The method of claim 1, wherein the secondary distribution is a mixture distribution determined responsive to a plurality of functions.

7. The method of claim 1, wherein iteratively calibrating the noise value of the differentially private result is responsive to the relative error of the differentially private result exceeding the target accuracy.

8. A non-transitory computer-readable storage medium storing computer program instructions executable by a processor to perform operations for performing an adaptive differentially private count operation on a set of data stored by a database, the operations comprising:
receiving a request from a client device to perform a query on the set of data stored by the database, the request identifying a target accuracy and a maximum privacy spend;
performing a count operation on the set of data to produce a result;

perturbing the result to produce a differentially private result using a noise value, the noise value being sampled from a first probability distribution based on a fractional privacy spend, the fractional privacy spend comprising a first fraction of the maximum privacy spend;

iteratively calibrating the noise value of the differentially private result based on a secondary distribution different from the first probability distribution and based on a new fractional privacy spend, the new fractional privacy spend comprising a second fraction of the maximum privacy spend, the new fractional privacy spend being larger than fractional privacy spends of preceding iterations, the iterations of calibrating the noise value occurring until
    a relative error of the differentially private result is less than or equal to the target accuracy; and sending, to the client device, the differentially private result.

9. The non-transitory computer-readable storage medium of claim 8, wherein iteratively calibrating the noise value of the differentially private result based on the secondary distribution different from the first probability distribution comprises, for an iteration:

generating the new fractional privacy spend larger than the fractional privacy spends of preceding iterations;

generating a new noise value sampled from the secondary distribution based on the new fractional privacy spend;

incorporating the new noise value into the differentially private result; and determining whether the differentially private result is less than or equal to the target accuracy.

10. The non-transitory computer-readable storage medium of claim 9, wherein determining whether the differentially private result is less than or equal to the target accuracy comprises:

estimating the relative error of the differentially private result; and comparing the relative error to the target accuracy.

11. The non-transitory computer-readable storage medium of claim 9, wherein the new fractional privacy spend is generated as a multiple of a preceding fractional privacy spend of a preceding iteration.

12. The non-transitory computer-readable storage medium of claim 9, wherein the new fractional privacy spend is generated as a function of a difference between the target accuracy and the relative error of the differentially private result of a preceding iteration.

13. The non-transitory computer-readable storage medium of claim 8, wherein the secondary distribution is a mixture distribution determined responsive to a plurality of functions.

14. The non-transitory computer-readable storage medium of claim 8, wherein iteratively calibrating the noise value of the differentially private result is responsive to the relative error of the differentially private result exceeding the target accuracy.

15. A system comprising:
a processor; and a non-transitory computer-readable storage medium storing computer program instructions executable by a processor to perform operations for performing an adaptive differentially private count operation on a set of data stored by a database, the operations comprising:

receiving a request from a client device to perform a query on the set of data stored by the database, the request identifying a target accuracy and a maximum privacy spend;

performing a count operation on the set of data to produce a result;

perturbing the result to produce a differentially private result using a noise value, the noise value being sampled from a first probability distribution based on a fractional privacy spend, the fractional privacy spend comprising a first fraction of the maximum privacy spend;

iteratively calibrating the noise value of the differentially private result based on a secondary distribution different from the first probability distribution and based on a new fractional privacy spend, the new fractional privacy spend comprising a second fraction of the maximum privacy spend, the new fractional privacy spend being larger than fractional privacy spends of preceding iterations, the iterations of calibrating the noise value occurring until
    a relative error of the differentially private result is less than or equal to the target accuracy; and sending, to the client device, the differentially private result.

16. The system of claim 15, wherein iteratively calibrating the noise value of the differentially private result based on the secondary distribution different from the first probability distribution comprises, for an iteration:

generating the new fractional privacy spend larger than the fractional privacy spends of preceding iterations;

generating a new noise value sampled from the secondary distribution based on the new fractional privacy spend;

incorporating the new noise value into the differentially private result; and determining whether the differentially private result is less than or equal to the target accuracy.

17. The system of claim 16, wherein determining whether the differentially private result is less than or equal to the target accuracy comprises:

estimating the relative error of the differentially private result; and comparing the relative error to the target accuracy.

18. The system of claim 16, wherein the new fractional privacy spend is generated as a multiple of a preceding fractional privacy spend of a preceding iteration.

19. The system of claim 16, wherein the new fractional privacy spend is generated as a function of a difference between the target accuracy and the relative error of the differentially private result of a preceding iteration.

20. The system of claim 15, wherein iteratively calibrating the noise value of the differentially private result is responsive to the relative error of the differentially private result exceeding the target accuracy.

* * * * *